US012469255B2

(12) United States Patent
Ghosh et al.

(10) Patent No.: US 12,469,255 B2
(45) Date of Patent: Nov. 11, 2025

(54) SYSTEMS AND METHODS FOR IDENTIFYING DIFFERENT PRODUCT IDENTIFIERS THAT CORRESPOND TO THE SAME PRODUCT

(71) Applicant: Walmart Apollo, LLC, Bentonville, AR (US)

(72) Inventors: Ashlin Ghosh, Ernakulam (IN); Feiyun Zhu, Allen, TX (US); Avinash M. Jade, Bangalore (IN); Lingfeng Zhang, Dallas, TX (US); Amit Jhunjhunwala, Bangalore (IN); Raghava Balusu, Achanta (IN); William Craig Robinson, Jr., Centerton, AR (US); Benjamin R. Ellison, San Francisco, CA (US); Srinivas Muktevi, Bengaluru (IN); Zhaoliang Duan, Frisco, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 333 days.

(21) Appl. No.: 18/168,198

(22) Filed: Feb. 13, 2023

(65) Prior Publication Data
US 2024/0273863 A1    Aug. 15, 2024

(51) Int. Cl.
G06V 10/74    (2022.01)
G06Q 10/087   (2023.01)
G06V 10/762   (2022.01)

(52) U.S. Cl.
CPC ......... *G06V 10/762* (2022.01); *G06Q 10/087* (2013.01); *G06V 10/761* (2022.01); *G06V 2201/07* (2022.01)

(58) Field of Classification Search
CPC .............. G06V 10/762; G06V 10/761; G06V 2201/07; G06Q 10/087
See application file for complete search history.

(56) References Cited

U.S. PATENT DOCUMENTS 5,074,594 A    12/1991 Laganowski
6,570,492 B1    5/2003 Peratoner
(Continued)

FOREIGN PATENT DOCUMENTS

CN    106347550 B    8/2019
CN    110348439 B    10/2019
(Continued)

OTHER PUBLICATIONS

Klasson et al, Using Variational Multi-view Learning for Classification of Grocery Items, Patterns 1, 100143 pp. 1-19. (Year: 2020).*
(Continued)

*Primary Examiner* — Kathleen M Broughton
(74) *Attorney, Agent, or Firm* — Foley IP Law, PLLC

(57) ABSTRACT

In some embodiments, apparatuses and methods are provided herein useful to processing captured images. In some embodiments, there is provided a system for processing captured images of objects at a product storage facility including a trained machine learning model; and a control circuit. The control circuit may group a plurality of product identifiers into one or more clusters based on at least one of visual similarity of corresponding images, textual similarity of corresponding associated descriptions, and associated relationships between product identifiers of the plurality of product identifiers; determine clusters having common elements that are at least within a similarity threshold of each other; merge the clusters with the common elements; and generate a mapping dataset used to retrain the trained machine learning model to identify a plurality of objects. The mapping dataset may include a plurality of associations of associated product identifiers to a single object.

20 Claims, 13 Drawing Sheets

(56) References Cited

U.S. PATENT DOCUMENTS

| | | | |
|---|---|---|---|
| 8,165,407 B1 | 4/2012 | Khosla et al. | |
| 8,352,465 B1* | 1/2013 | Jing | G06F 16/583 707/723 |
| 8,700,494 B2 | 4/2014 | Carlson | |
| 8,923,650 B2 | 12/2014 | Wexler | |
| 8,965,104 B1 | 2/2015 | Hickman | |
| 9,275,308 B2 | 3/2016 | Szegedy | |
| 9,477,955 B2 | 10/2016 | Goncalves | |
| 9,526,127 B1 | 12/2016 | Taubman | |
| 9,576,310 B2 | 2/2017 | Cancro | |
| 9,659,204 B2 | 5/2017 | Wu | |
| 9,811,754 B2 | 11/2017 | Schwartz | |
| 10,002,344 B2 | 6/2018 | Wu | |
| 10,019,803 B2 | 7/2018 | Venable | |
| 10,032,072 B1 | 7/2018 | Tran | |
| 10,129,524 B2 | 11/2018 | Ng | |
| 10,210,432 B2 | 2/2019 | Pisoni | |
| 10,373,116 B2 | 8/2019 | Medina | |
| 10,445,569 B1 | 10/2019 | Lin et al. | |
| 10,572,757 B2 | 2/2020 | Graham | |
| 10,592,854 B2 | 3/2020 | Schwartz | |
| 10,664,722 B1 | 5/2020 | Sharma et al. | |
| 10,796,352 B2 | 10/2020 | Chechuy | |
| 10,839,452 B1 | 11/2020 | Guo | |
| 10,922,574 B1 | 2/2021 | Tariq | |
| 10,943,278 B2 | 3/2021 | Benkreira | |
| 10,956,711 B2 | 3/2021 | Adato | |
| 10,990,950 B2 | 4/2021 | Garner | |
| 10,991,036 B1 | 4/2021 | Bergstrom | |
| 11,036,949 B2 | 6/2021 | Powell | |
| 11,055,905 B2 | 7/2021 | Tagra | |
| 11,087,272 B2 | 8/2021 | Skaff | |
| 11,151,426 B2 | 10/2021 | Dutta | |
| 11,163,805 B2 | 11/2021 | Arocho | |
| 11,276,034 B2 | 3/2022 | Shah | |
| 11,282,287 B2 | 3/2022 | Gausebeck | |
| 11,295,163 B1 | 4/2022 | Schoner | |
| 11,308,775 B1 | 4/2022 | Sinha | |
| 11,409,977 B1 | 8/2022 | Glaser | |
| 2005/0238465 A1 | 10/2005 | Razumov | |
| 2010/0188580 A1 | 7/2010 | Paschalaks | |
| 2011/0040427 A1 | 2/2011 | Ben-Tzvi | |
| 2012/0303412 A1 | 11/2012 | Etzioni | |
| 2014/0002239 A1 | 1/2014 | Rayner | |
| 2014/0247116 A1 | 9/2014 | Davidson | |
| 2014/0307938 A1 | 10/2014 | Doi | |
| 2015/0363660 A1 | 12/2015 | Vidal | |
| 2016/0203525 A1 | 7/2016 | Hara | |
| 2017/0106738 A1 | 4/2017 | Gillett | |
| 2017/0286773 A1 | 10/2017 | Skaff | |
| 2018/0005176 A1 | 1/2018 | Williams | |
| 2018/0018788 A1 | 1/2018 | Olmstead | |
| 2018/0108134 A1 | 4/2018 | Venable | |
| 2018/0197223 A1 | 7/2018 | Grossman | |
| 2018/0260772 A1 | 9/2018 | Chaubard | |
| 2019/0025849 A1 | 1/2019 | Dean | |
| 2019/0043003 A1 | 2/2019 | Fisher | |
| 2019/0050932 A1 | 2/2019 | Dey | |
| 2019/0087772 A1 | 3/2019 | Medina | |
| 2019/0163698 A1 | 5/2019 | Kwon | |
| 2019/0197561 A1 | 6/2019 | Adato | |
| 2019/0220482 A1 | 7/2019 | Crosby | |
| 2019/0236531 A1 | 8/2019 | Adato | |
| 2020/0118063 A1 | 4/2020 | Fu | |
| 2020/0193206 A1 | 6/2020 | Turkelson et al. | |
| 2020/0242392 A1 | 7/2020 | Scott et al. | |
| 2020/0246977 A1 | 8/2020 | Swietojanski | |
| 2020/0265494 A1 | 8/2020 | Glaser | |
| 2020/0324976 A1 | 10/2020 | Diehr | |
| 2020/0356813 A1 | 11/2020 | Sharma | |
| 2020/0380226 A1 | 12/2020 | Rodriguez | |
| 2020/0387858 A1 | 12/2020 | Hasan | |
| 2021/0049541 A1 | 2/2021 | Gong | |
| 2021/0049542 A1 | 2/2021 | Dalal | |
| 2021/0125001 A1* | 4/2021 | Guo | G06F 16/55 |
| 2021/0142097 A1 | 5/2021 | Zheng et al. | |
| 2021/0142105 A1 | 5/2021 | Siskind | |
| 2021/0150231 A1 | 5/2021 | Kehl | |
| 2021/0192780 A1 | 6/2021 | Kulkarni | |
| 2021/0216954 A1 | 7/2021 | Chaubard | |
| 2021/0272269 A1 | 9/2021 | Suzuki | |
| 2021/0319684 A1 | 10/2021 | Ma | |
| 2021/0342914 A1 | 11/2021 | Dalal | |
| 2021/0400195 A1 | 12/2021 | Adato | |
| 2021/0406812 A1 | 12/2021 | Deshmukh | |
| 2022/0043547 A1 | 2/2022 | Jahjah | |
| 2022/0051179 A1 | 2/2022 | Savvides | |
| 2022/0058425 A1 | 2/2022 | Savvides | |
| 2022/0067085 A1 | 3/2022 | Nihas | |
| 2022/0114403 A1 | 4/2022 | Shaw | |
| 2022/0114537 A1* | 4/2022 | Griffin | G06T 11/20 |
| 2022/0114821 A1 | 4/2022 | Arroyo | |
| 2022/0121852 A1* | 4/2022 | Curtis | G06N 3/045 |
| 2022/0138914 A1 | 5/2022 | Wang | |
| 2022/0165074 A1 | 5/2022 | Srivastava | |
| 2022/0222924 A1 | 7/2022 | Pan | |
| 2022/0262008 A1 | 8/2022 | Kidd | |
| 2023/0078604 A1* | 3/2023 | Rein | G06T 7/73 382/103 |
| 2024/0119409 A1* | 4/2024 | Balusu | G06F 16/55 |
| 2024/0249506 A1* | 7/2024 | Arora | G06V 10/945 |
| 2024/0257047 A1* | 8/2024 | Balusu | G06V 20/52 |
| 2024/0265565 A1* | 8/2024 | Zhang | G06T 7/70 |
| 2024/0273463 A1* | 8/2024 | Pachauri | G06V 10/7715 |

FOREIGN PATENT DOCUMENTS

| | | | |
|---|---|---|---|
| CN | 110443298 B | 2/2022 | |
| CN | 114898358 A | 8/2022 | |
| CN | 115205584 A | 10/2022 | |
| EP | 3217324 A1 | 9/2017 | |
| EP | 3437031 | 2/2019 | |
| EP | 3479298 | 5/2019 | |
| WO | 2006113281 A2 | 10/2006 | |
| WO | 2017201490 A1 | 11/2017 | |
| WO | 2018093796 | 5/2018 | |
| WO | 2020051213 A1 | 3/2020 | |
| WO | WO-2021152070 A1 * | 8/2021 | G01S 17/46 |
| WO | 2021186176 A1 | 9/2021 | |
| WO | 2021247420 A2 | 12/2021 | |

OTHER PUBLICATIONS

Rodriquez, K., PCT International Search Report and Written Opinion, mailed May 22, 2024, in connection with International Application No. PCT/US2024/14689, all pages.
U.S. Appl. No. 17/963,751, filed Oct. 11, 2022, Yilun Chen.
U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 2, 2023, Han Zhang.
U.S. Appl. No. 18/168,174, filed Feb. 13, 2023, Abhinav Pachauri.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd

(56) References Cited

OTHER PUBLICATIONS

International Conference on Information Reuse and Integration for Data Science (IRI); Aug. 9-11, 2022; IEEE; <https://ieeexplore.ieee.org/document/9874231>; 6 pages.

Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.

Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-15.

Paolanti, Marine et al.; "Mobile robot for retail surveying and inventory using visual and textual analysis of monocular pictures based on deep learning"; European Conference on Mobile Robots; Sep. 2017, 6 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-6.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal, et al.; "Object identification for inventory management using convolutional neural network"; IEEE Applied Imagery Pattern Recognition Workshop (AIPR); Oct. 2016, 6 pages.

Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

\* cited by examiner

FIG. 7

GROUPING BASED ON TEXT SIMILARITY

706 —

| NAME: | VALUE |
|---|---|
| UPC: | 00012650313811 TS CATALOG |
| CLUB_NUM: | 4652 |
| NAME: | 2PK GOLF UMBRELLA |
| LINE1_DES: | 2PK GOLF UMBRELLA |
| LINE3_DES: | |
| CATEGORY_DESC: | SPORTING GOODS |
| SUB_CATEGORY_DESC: | GENERAL SPORTS & HYDRATION |

| NAME | VALUE |
|---|---|
| ITEM_NBR | 54563299 I 980182762 |
| UNIT_PRICE: | 19.98 |
| SNG_DES: | 2PK GOLF UMBRELLA |
| LINE2_DES: | |
| IMAGE_URL: | NAUTICA HTTP://SCENE7.SAMECLUB.COM/IS/IMAGE/SAMS CLUB/00012655031139_A |
| CATEGORY_NBR: | 9 |
| SUB_CATEGORY_NBR: | 22 |

NO IMAGE AVAILABLE

KEYWORDS

708 —

| NAME: | VALUE |
|---|---|
| UPC: | 00012655033722 I TS CATALOG |
| CLUB_NUM: | 6378 |
| NAME: | 2 PACK GOLF UMBRELLA SET |
| LINE1_DES: | 2 PK GOLF UMBRELLA |
| LINE3_DES: | |
| CATEGORY_DESC: | SPORTING GOODS |
| SUB_CATEGORY_DESC: | GENERAL SPORTS & HYDRATION |

| NAME | VALUE |
|---|---|
| ITEM_NBC | 54355849 I 890169131 |
| UNIT_PRICE: | 19.98 |
| SNG_DES: | |
| LINE2_DES: | NAUTICA |
| IMAGE_URL: | HTTP://SCENE7.SAMECLUB.COM/IS/IMAGE/SAMS CLUB/00040080169131_A |
| CATEGORY_NBR: | 9 |
| SUB_CATEGORY_NBR: | 22 |

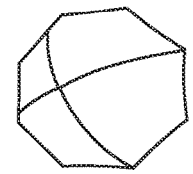

KEYWORDS 702    704    704    702

FIG. 7 CONT.

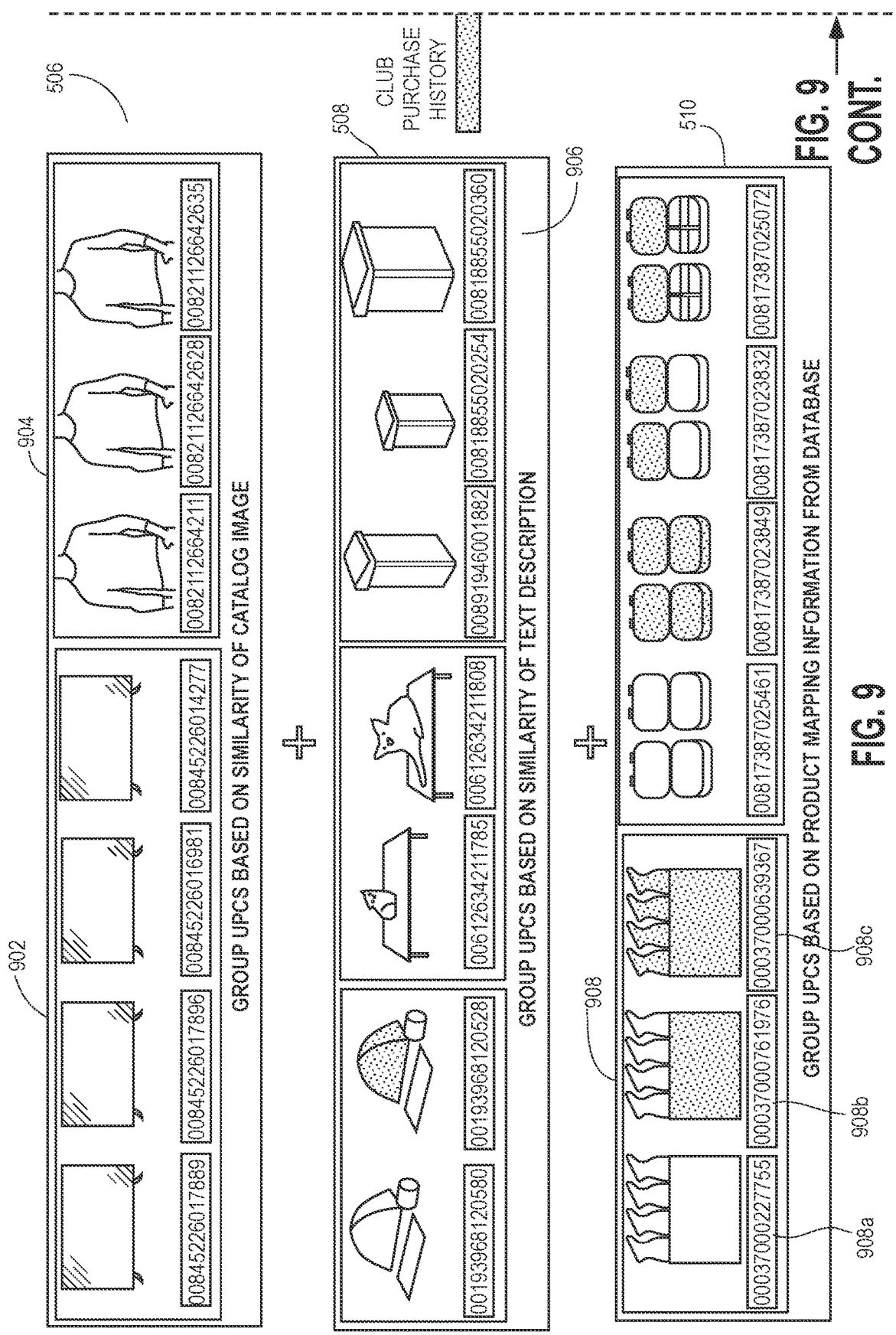

SYSTEMS AND METHODS FOR IDENTIFYING DIFFERENT PRODUCT IDENTIFIERS THAT CORRESPOND TO THE SAME PRODUCT

TECHNICAL FIELD

This invention relates generally to recognition of objects in images, and more specifically to training machine learning models to recognize objects in images.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect or inventory product display shelves and/or pallet storage areas to determine which of the products are adequately stocked and which products are or will soon be out of stock and need to be replenished.

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems, apparatuses and methods pertaining to processing captured images of objects at a product storage facility. This description includes drawings, wherein.

Figure 1:
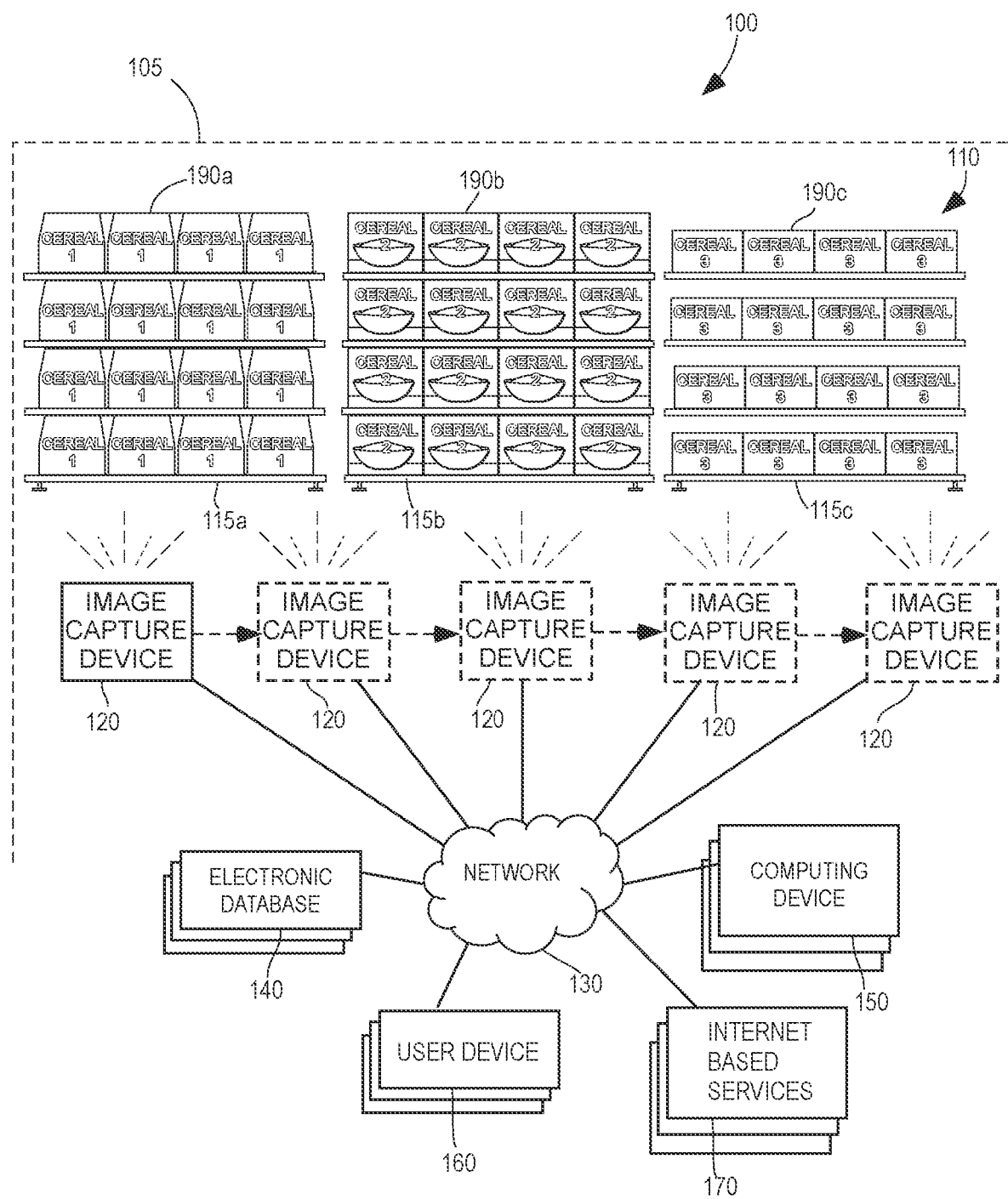
FIG. 1 is a diagram of an exemplary system of updating inventory of products at a product storage facility in accordance with some embodiments, depicting a front view of a product storage area storing groups of various individual products for sale and stored at a product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for processing captured images of objects at a product storage facility. In some embodiments, a system for processing captured images of objects at a product storage facility includes a control circuit executing a trained machine learning model stored in a memory. For example, the control circuit executing the trained machine learning model may group a plurality of product identifiers into one or more clusters based on at least one of visual similarity of corresponding images, textual similarity of corresponding associated descriptions, and associated relationships between product identifiers of the plurality of product identifiers. Alternatively or in addition to, the control circuit executing the trained machine learning model may determine clusters having common elements that are at least within a similarity threshold of each other. Alternatively or in addition to, the control circuit executing the trained machine learning model may merge the clusters with the common elements. Alternatively or in addition to, the control circuit executing the trained machine learning model may generate a mapping dataset used to retrain the trained machine learning model to identify a plurality of objects. The mapping dataset may include a plurality of associations of associated product identifiers to a single object.

In some embodiments, a method for processing captured images of objects at a product storage facility includes grouping, by a control circuit executing a trained machine learning model stored in a memory, a plurality of product identifiers into one or more clusters based on at least one of visual similarity of corresponding images, textual similarity of corresponding associated descriptions, and associated relationships between product identifiers of the plurality of product identifiers. Alternatively or in addition to, the method may include determining, by the control circuit executing the trained machine learning model, clusters having common elements that are at least within a similarity threshold of each other. Alternatively or in addition to, the method may include merging, by the control circuit executing the trained machine learning model, the clusters with the common elements. Alternatively or in addition to, the method may include generating, by the control circuit executing the trained machine learning model, a mapping dataset used to retrain the trained machine learning model to identify a plurality of objects. The mapping dataset may include a plurality of associations of associated product identifiers to a single object.

FIG. 1 shows an embodiment of a system 100 of updating inventory of products for sale and stored at product storage areas 110 and/or on product storage structures 115 of a product storage facility 105 (which may be a retail store, a product distribution center, a fulfillment center, a warehouse, etc.). The system 100 is illustrated in FIG. 1 for simplicity with only one movable image capture device 120 that moves about one product storage area 110 containing three separate product storage structures 115a, 115b, and 115c, but it will be appreciated that, depending on the size of the product storage facility, the system 100 may include multiple movable image capture devices 120 located throughout the product storage facility that monitor hundreds of product storage areas 110 and thousands of product storage structures 115a-115c. It is understood that the movement about the product storage area 110 by the image capture device(s) 120 may depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190a-190c may be stored, and may include a rack, a pallet, a shelf cabinet, a single shelf, a shelving unit, table, rack, displays, bins, gondola, case, countertop, or another product display. Likewise, it will be appreciated that the number of individual products 190a-190c representing three exemplary distinct products (labeled as "Cereal 1," "Cereal 2," and "Cereal 3") is chosen by way of example only. Further, the size and shape of the products 190a-190c in FIG. 1 have been shown by way of example only, and it will be appreciated that the individual products 190a-190c may have various sizes and shapes. Notably, the term products 190 may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured to move around the product storage facility (e.g., on the floor via a motorized or non-motorized wheel-based/track-based locomotion system, via slidable tracks above the floor, via a toothed metal wheel/linked metal tracks system, etc.) such that, when moving (e.g., about an aisle or other area of a product storage facility 105), the image capture device 120 has a field of view that includes at least a portion of one or more of the product storage structures 115a-115c within a given product storage area 110 of the product storage facility 105, permitting the image capture device 120 to capture multiple images of the product storage area 110 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet-based/cloud-based service module) is configured to process such images as will be described in more detail below.

The exemplary system 100 shown in FIG. 1 includes an electronic database 140. Generally, the exemplary electronic database 140 may be configured as a single database, or a collection of multiple communicatively connected databases (e.g., digital image database, meta data database, inventory database, pricing database, customer database, vendor database, manufacturer database, etc.) and may be configured to store various raw and processed images of the product storage area 110 captured by the image capture device 120 while the image capture device 120 may be moving around the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based. In some embodiments, the electronic database 140 may include one or more memory devices, computer data storage, and/or cloud-based data storage configured to store one or more of product inventories, pricing, and/or demand, and/or customer, vendor, and/or manufacturer data.

The system 100 of FIG. 1 further includes a computing device 150 configured to communicate with the electronic database 140, user devices 160, and/or internet-based services 170, and the image capture device 120 over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, portions of the network 130 are located at or in the product storage facility.

The computing device 150 may be a stationary or portable electronic device, for example, a server, a cloud-server, a series of communicatively connected servers, a computer cluster, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
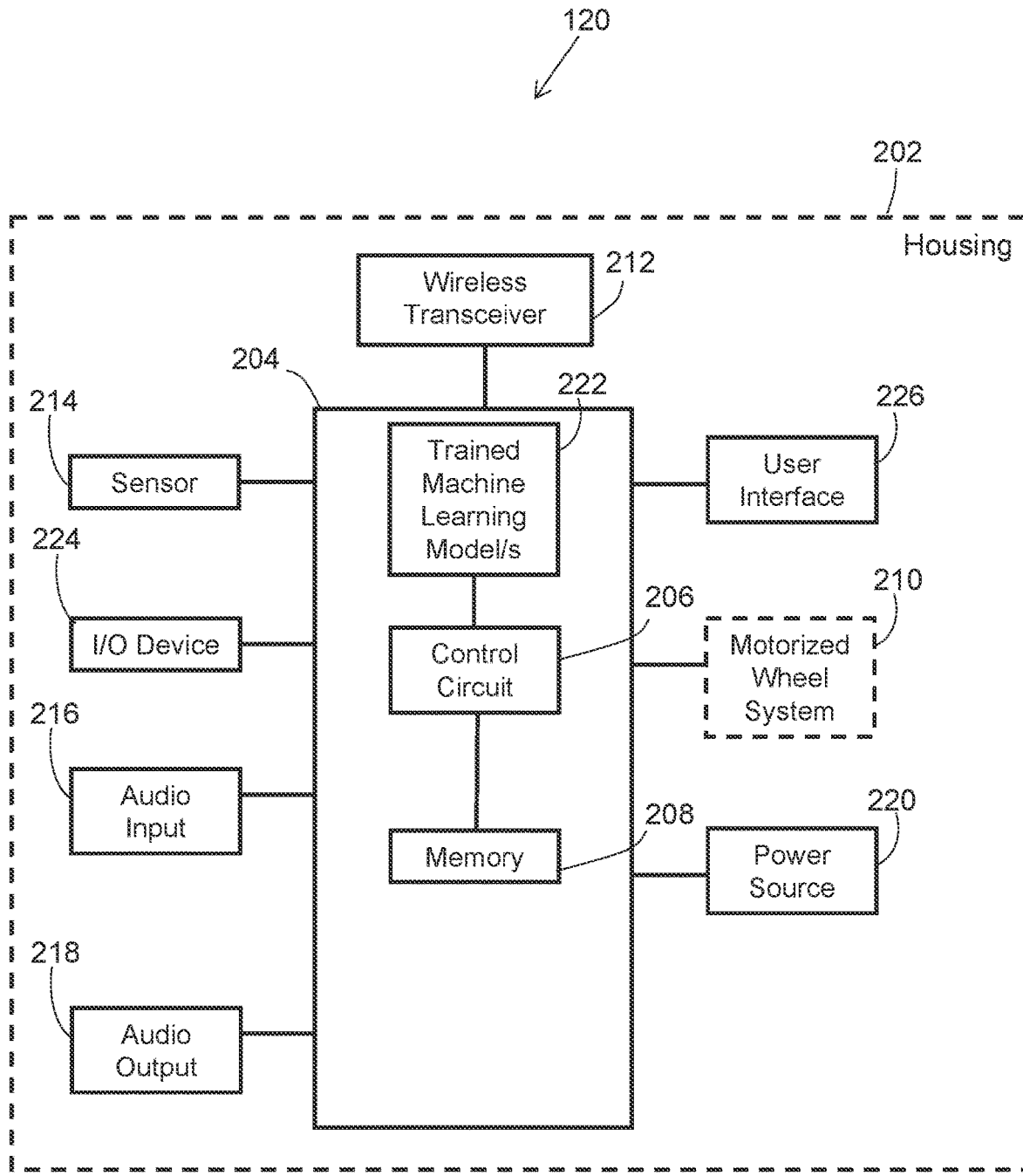
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move around the product storage facility 105, and may instead be moved (e.g., driven, pushed, carried, worn, etc.) by a human operator, or may be movably coupled to a track system (which may be above the floor level or at the floor level) that permits the image capture device 120 to move around the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates around a horizontal axis) under power to thereby cause the image capture device 120 to move through interaction with, e.g., the floor of the product storage facility. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility. So configured, the control circuit 206 of the image capture device 120 can provide information to the computing device 150 (via the network 130) and can receive information and/or movement instructions (instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility or other motorized image capture devices 120 moving around the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 224 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 224 may work together with or separate from any user interface implemented at an optional user interface unit or user device 160 (such as a smart phone or tablet device) usable by a worker at the product storage facility. In some embodiments, the user interface 224 is separate from the image capture device 202, e.g., in a separate housing or device wired or wirelessly coupled to the image capture device 202. In some embodiments, the user interface may be implemented in a mobile user device 160 carried by a person and configured for communication over the network 130 with the image capture device 102.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules 222 to perform at some of the functions. For example, the control circuit 206 may be trained to process one or more images of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 222 includes a computer program code stored in a memory 208 and/or executed by the control circuit 206 to process one or more images, as described in more detail below.

It is noted that not all components illustrated in FIG. 2 are included in all embodiments of the motorized image capture device 120. That is, some components may be optional depending on the implementation of the motorized image capture device 120.

Figure 3:
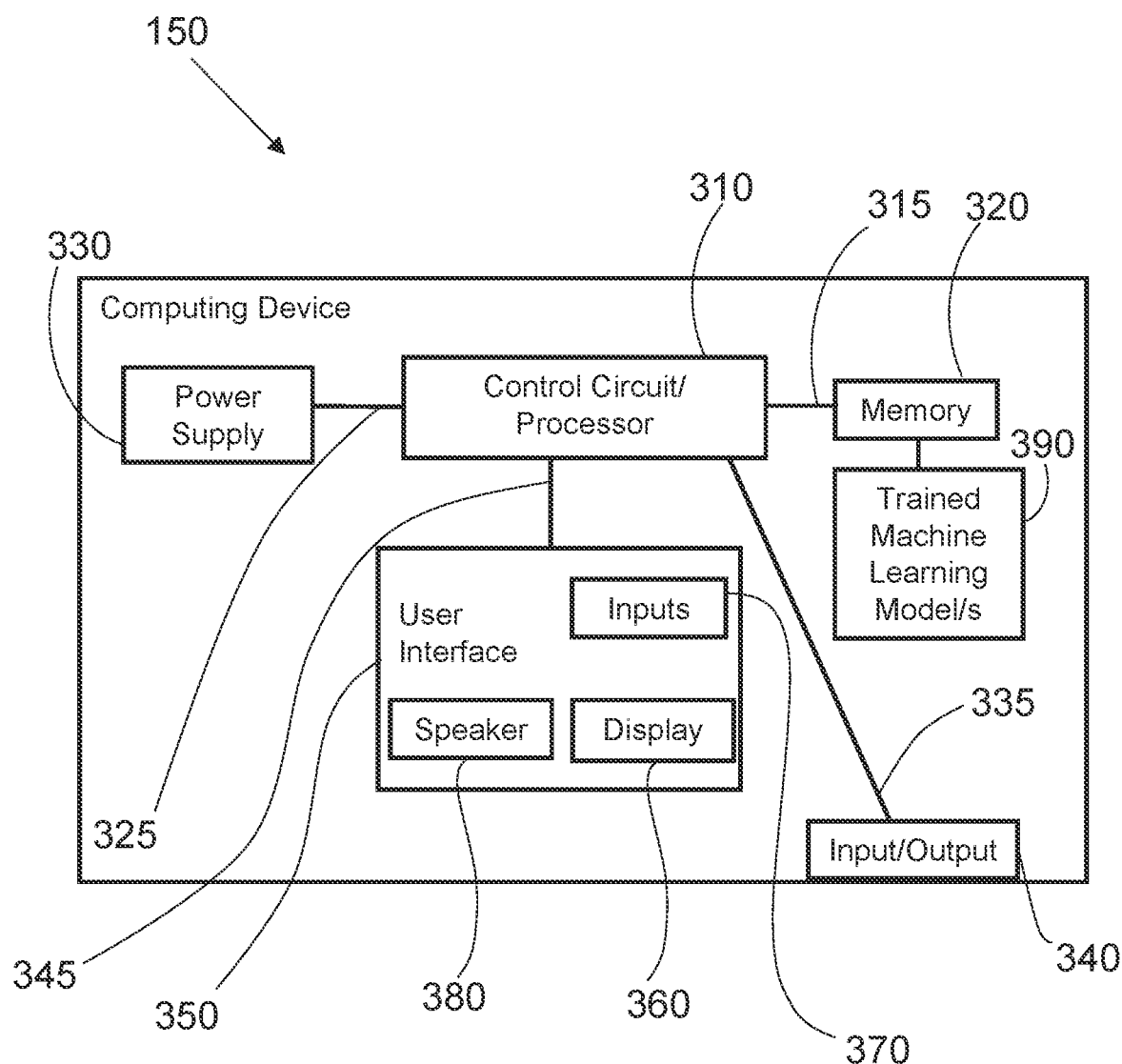
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, etc., the electronic database 140, internet-based services 170 (e.g., image processing services, computer vision services, neural network services, etc.), and/or from another electronic device (e.g., an electronic or user device of a worker tasked with physically inspecting the product storage area 110 and/or the product storage structures 115a-115c and observe the individual products 190a-190c stocked thereon. The input/output 340 of the computing device 150 can also send signals to other devices, for example, a signal to the electronic database 140 including an image of a given product storage structure 115b selected by the control circuit 310 of the computing device 150 as fully showing the product storage structure 115b and each of the products 190b stored in the product storage structure 115b. Also, a signal may be sent by the computing device 150 via the input-output 340 to the image capture device 120 to, for example, provide a route of movement for the image capture device 120 through the product storage facility.

The processor-based control circuit 310 of the computing device 150 shown in FIG. 3 may be electrically or wirelessly coupled via a connection 345 to a user interface 350, which may include a visual display or display screen 360 (e.g., LED screen) and/or button input 370 that provide the user interface 350 with the ability to permit a user (e.g., worker at a the product storage facility 105 or a worker at a remote regional center) to access the computing device 150 by inputting commands via touch-screen and/or button operation and/or voice commands. Possible commands may, for example, cause the computing device 150 to cause transmission of an alert signal to an electronic mobile user device 160 of a worker at the product storage facility 105 to assign a task to the worker that requires the worker to visually inspect and/or restock a given product storage structure 115a-115c based on analysis by the computing device 150 of the image of the product storage structure 115a-115c captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human user.

As pointed out above, in some embodiments, the image capture device 120 moves around the product storage facility 105 (while being controlled remotely by the computing device 150 (or another remote device such as the user device 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence) multiple images of the product storage area 110 from various angles. In some aspects, the control circuit 310 of the computing device 150 obtains (e.g., from the electronic database 140 or directly from the image capture device 120) the images of the product storage area 110 captured by the image capture device 120 while moving about the product storage area 110.

The sensor 214 (e.g., digital camera) of the image capture device 120 is located and/or oriented on the image capture device 120 such that, when the image capture device 120 moves about the product storage area 110, the field of view of the sensor 214 includes only portions of adjacent product storage structures 115a-115c, or an entire product storage structure 115a-115c. In certain aspects, the image capture device 120 is configured to move about the product storage area 110 while capturing images of the product storage structures 115a-115c at certain predetermined time intervals (e.g., every 1 second, 5 seconds, 10 seconds, etc.).

The images captured by the image capture device 120 may be transmitted to the electronic database 140 for storage and/or to the computing device 150 for processing by the control circuit 310 and/or to a web-/cloud-based image processing service 170. In some embodiments, one or more of the image capture devices 120 of the exemplary system 100 depicted in FIG. 1 is mounted on or coupled to a motorized robotic unit similar to the motorized robotic image capture device 120 of FIG. 2.

In some embodiments, one or more of the image capture devices 120 of the exemplary system 100 depicted in FIG. 1 is configured to be stationary or mounted to a structure, such that the image capture device 120 may capture one or more images of an area having one or more products at the product storage facility. For example, the area may include a product storage area 110, and/or a portion of and/or an entire product storage structures 115a-115c of the product storage facility.

In some embodiments, the electronic database 140 stores data corresponding to the inventory of products in the product storage facility. The control circuit 310 processes the images captured by the image capture device 120 and causes an update to the inventory of products in the electronic database 140. In some embodiments, one or more steps in the processing of the images are via machine learning and/or computer vision models that may include one or more trained neural network models. In certain aspects, the neural network may be a deep convolutional neural network. The neural network may be trained using various data sets, including, but not limited to: raw image data extracted from the images captured by the image capture device 120; metadata extracted from the images captured by the image capture device 120; reference image data associated with reference images of various product storage structures 115a-115c at the product storage facility; reference images of various products 190a-190c stocked and/or sold at the product storage facility; and/or planogram data associated with the product storage facility.

Figure 4:
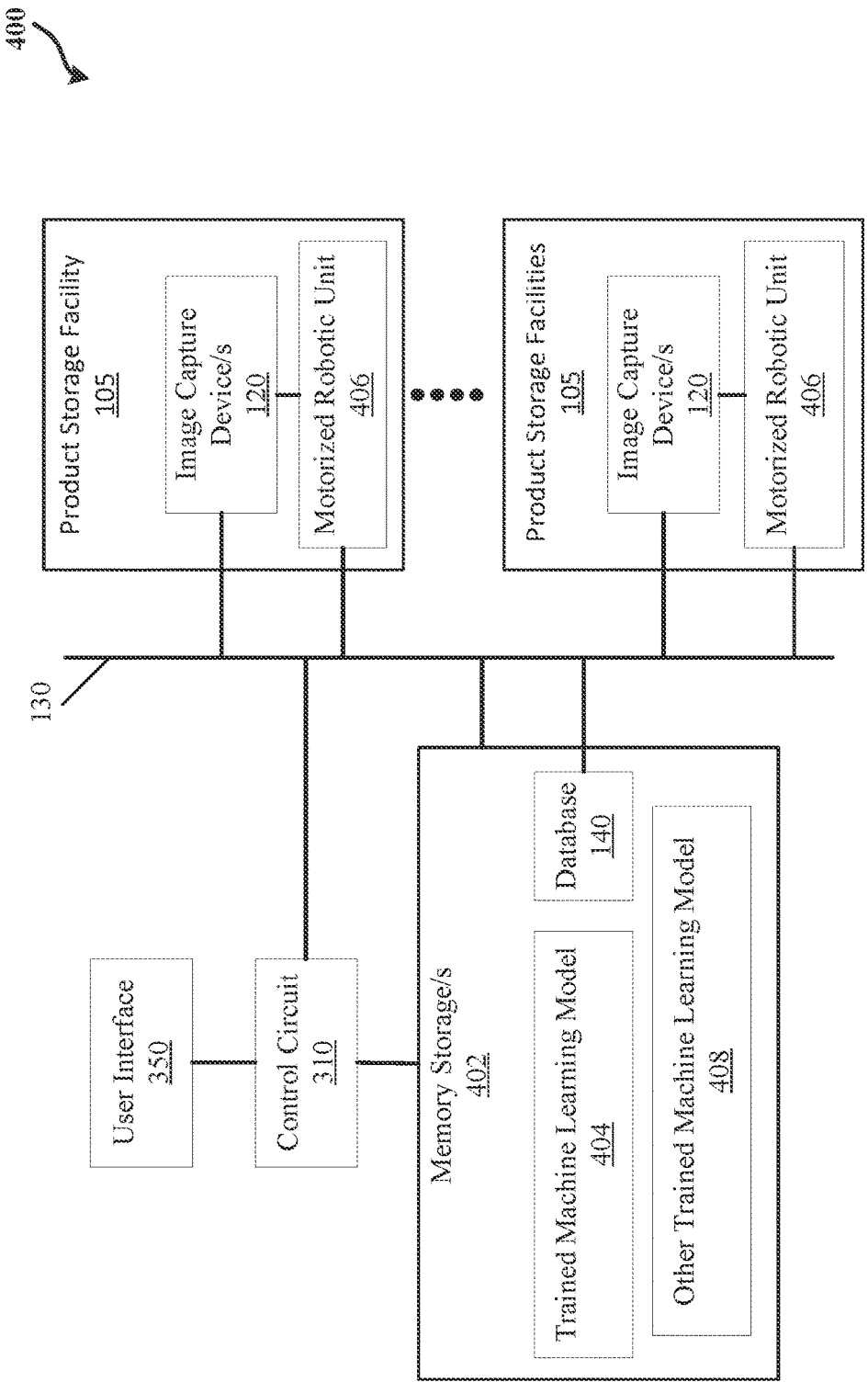
FIG. 4 illustrates a simplified block diagram of an exemplary system for processing captured images of objects at a product storage facility in accordance with some embodiments.

FIG. 4 illustrates a simplified block diagram of an exemplary system for labeling objects in images captured at one or more product storage facilities in accordance with some embodiments. The system 400 includes a control circuit 310. Alternatively or in addition to, the system 400 may include memory storage/s 402, a user interface 350, and/or product storage facilities 105 coupled via a network 130. In some embodiments, the memory storage/s 402 may be one or more of a cloud storage network, a solid state drive, a hard drive, a random access memory (RAM), a read only memory (ROM), and/or any storage devices capable of storing electronic data, or any combination thereof. In some embodiments, the memory storage/s 402 includes the memory 320. In such an embodiment, a trained machine learning model 404 includes trained machine learning model/s 390. In some embodiments, the memory storage/s 402 is separate and distinct from the memory 320. In such an embodiment, the trained machine learning model 404 may be associated with the trained machine learning model/s 390. For example, the trained machine learning model/s 390 may be a copied version of the trained machine learning model 404. Alternatively or in addition to, the trained machine learning model 222 may be a copied version of the trained machine learning model 404. In some embodiments, the processing of unprocessed captured images is processed by the trained machine learning model 222.

In some embodiments, the memory storage/s 402 includes a trained machine learning model 404 and/or a database 140. In some embodiments, the database 140 may be an organized collection of structured information, or data, typically stored electronically in a computer system (e.g. the system 100). In some embodiments, the database 140 may be controlled by a database management system (DBMS). In some embodiments, the DBMS may include the control circuit 310. In yet some embodiments, the DBMS may include another control circuit (not shown) separate and/or distinct from the control circuit 310.

In some embodiments, the control circuit 310 may be communicatively coupled to the trained machine learning model 404 including one or more trained computer vision/machine learning/neural network modules to perform at some or all of the functions described herein. For example, the control circuit 310 using the trained machine learning model 404 may be trained to process one or more images of product storage areas (e.g., aisles, racks, shelves, pallets, to name a few) at product storage facilities 105 to detect and/or recognize one or more products for purchase using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 404 includes a computer program code stored in the memory storage/s 402 and/or executed by the control circuit 310 to process one or more images, as described herein.

The product storage facility 105 may include one of a retail store, a distribution center, and/or a fulfillment center. In some embodiments, a user interface 350 includes an application stored in a memory (e.g., the memory 320 or the memory storage/s 402) and executable by the control circuit 310. In some embodiments, the user interface 350 may be coupled to the control circuit 310 and may be used by a user to at least one of associate a product with at least one depicted object in processed images or resolve that one or more objects depicted in the images is only associated with a single product. In some embodiments, an output of the user interface 350 is used to retrain the trained machine learning model 404.

In some embodiments, the trained machine learning model 404 processes unprocessed captured images. For example, unprocessed captured images may include images captured by and/or output by the image capture device/s 120. Alternatively or in addition to, the unprocessed captured images may include images that have not gone through object detection or object classification by the control circuit 310. In some embodiments, at least some of the unprocessed captured images depict objects in the product storage facility 105.

In some embodiments, the control circuit 310 may use another/other trained machine learning model 408 to detect the objects and enclose each detected object inside the bounding box. The other trained machine learning model 408 may be distinct from the trained machine learning model 404.

Figure 5:
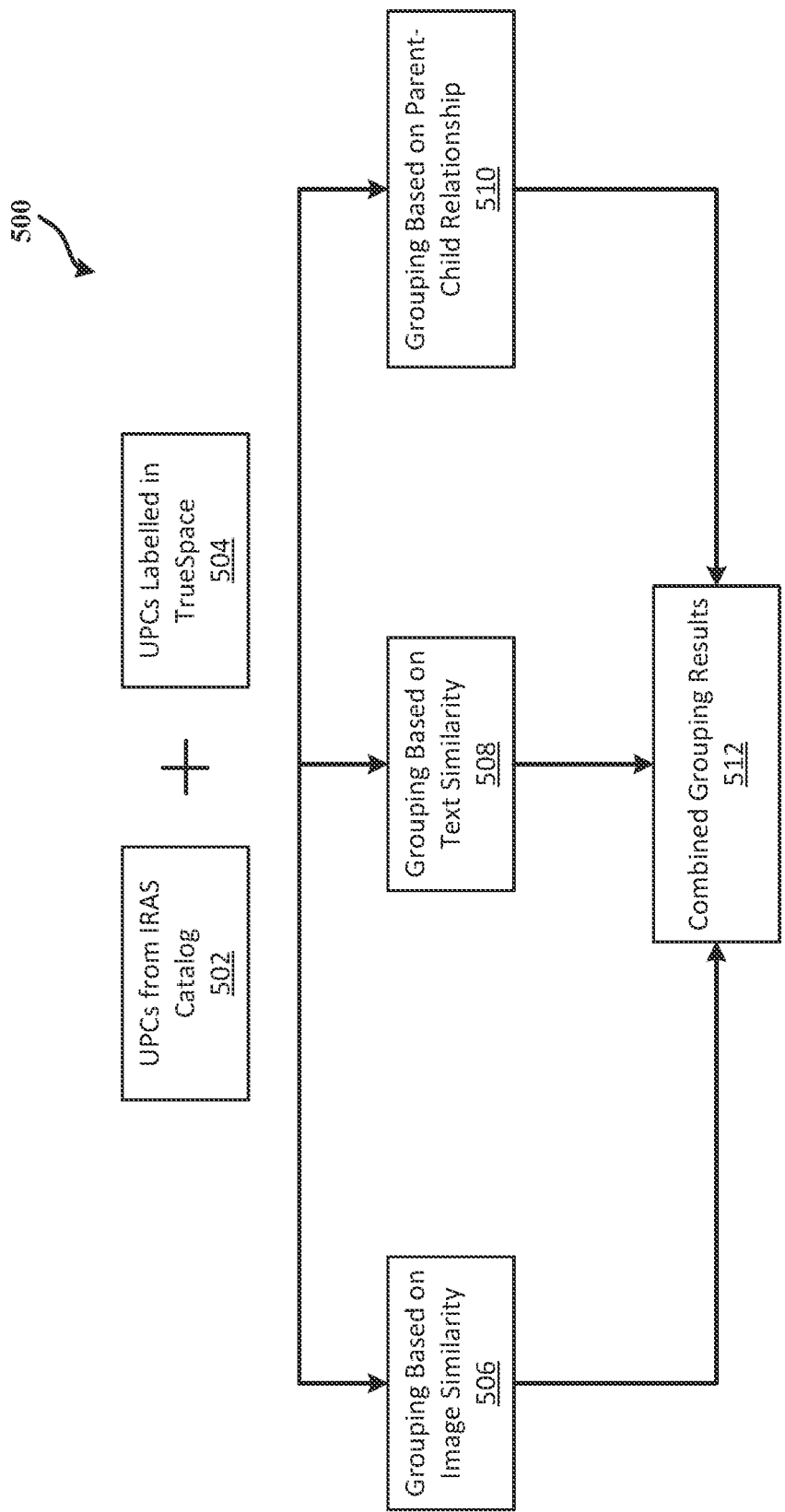
FIG. 5 is a simplified block diagram of example groupings of product identifiers in accordance with some embodiments.
Figure 6:
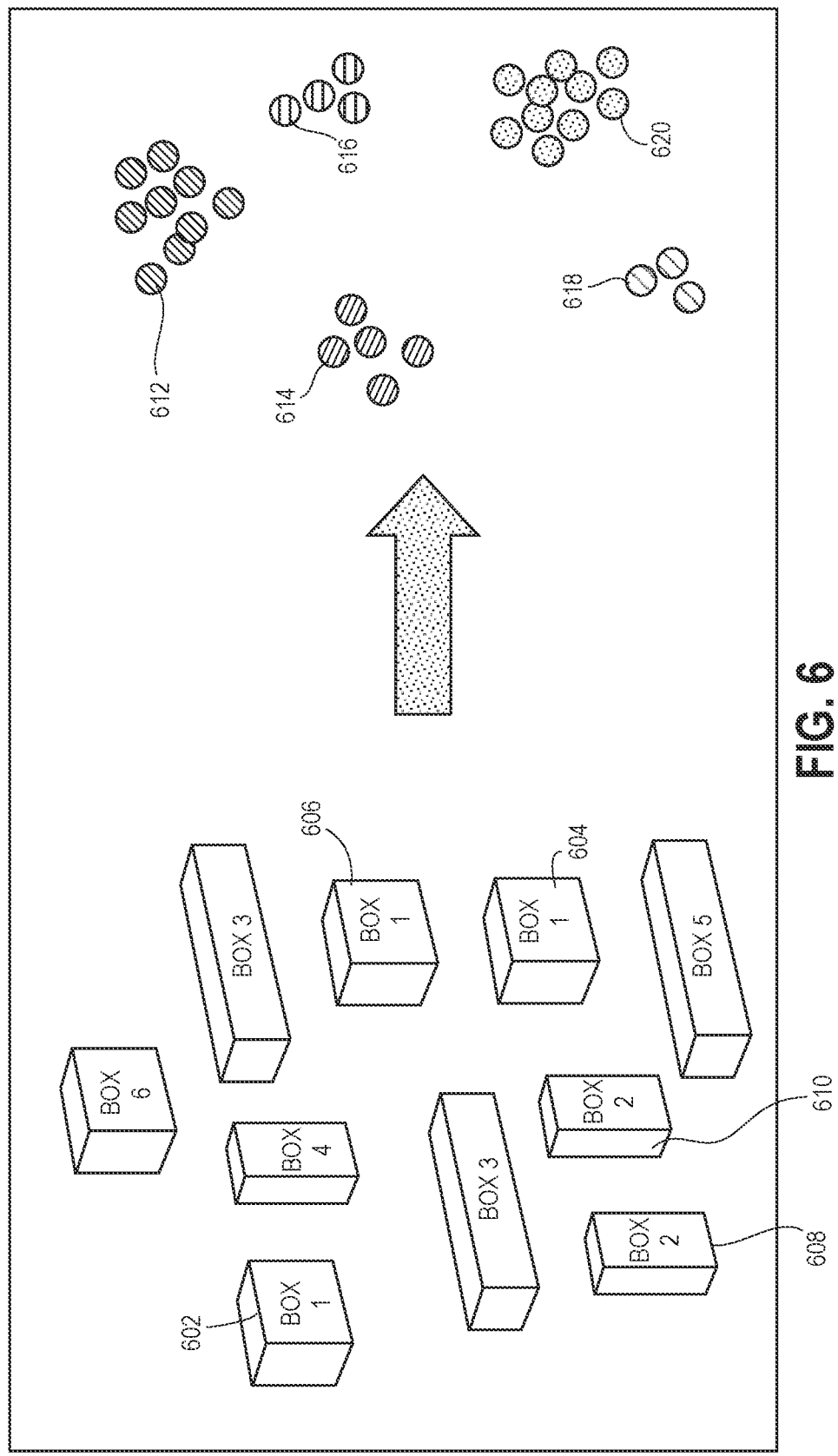
FIG. 6 is a visual illustration of grouping based on image similarity in accordance with some embodiments.
Figure 7:
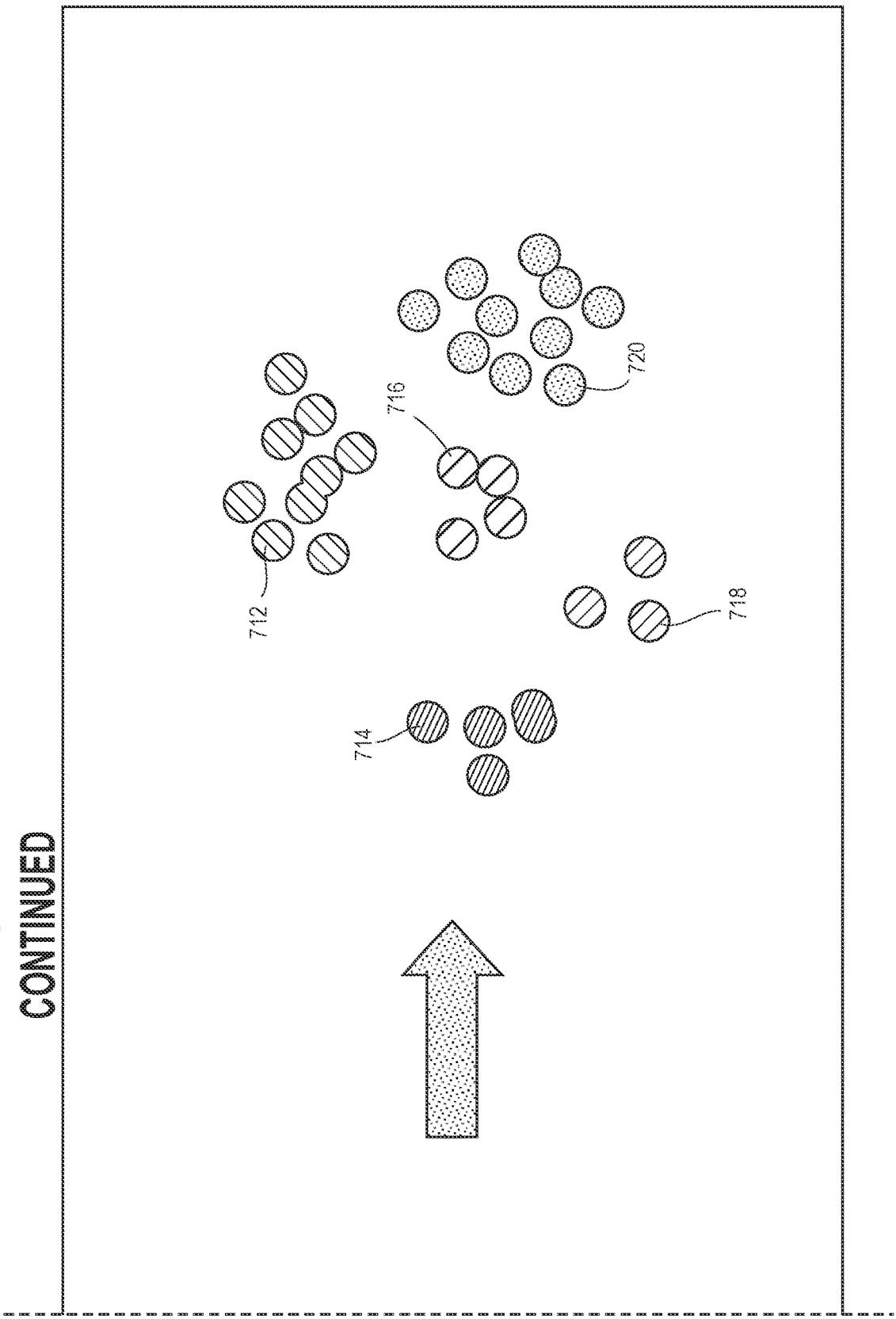
FIG. 7 is a visual illustration of grouping based on text similarity in accordance with some embodiments.
Figure 8:
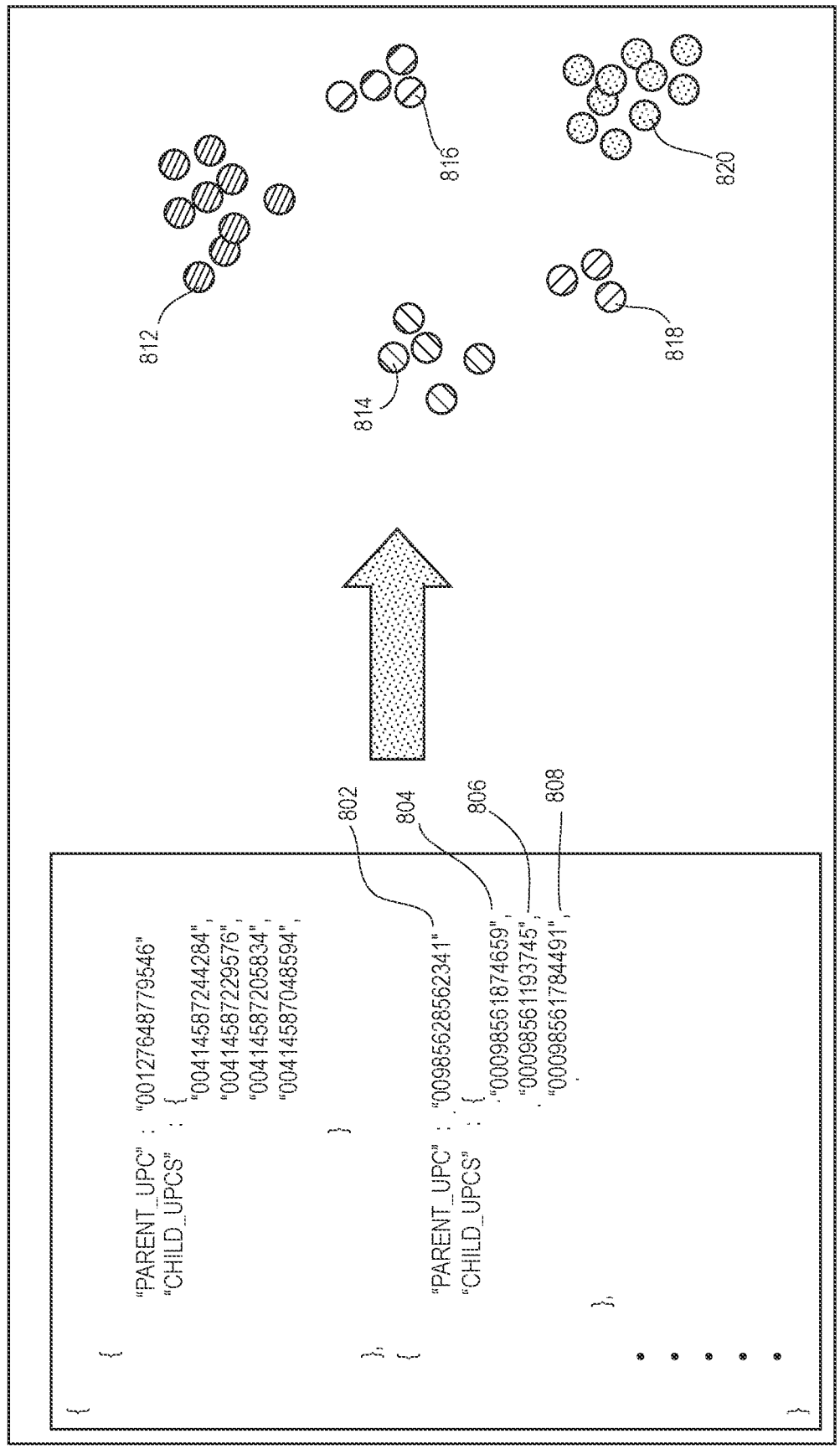
FIG. 8 is a visual illustration of grouping based on parent-child relationship in accordance with some embodiments.
Figure 9:
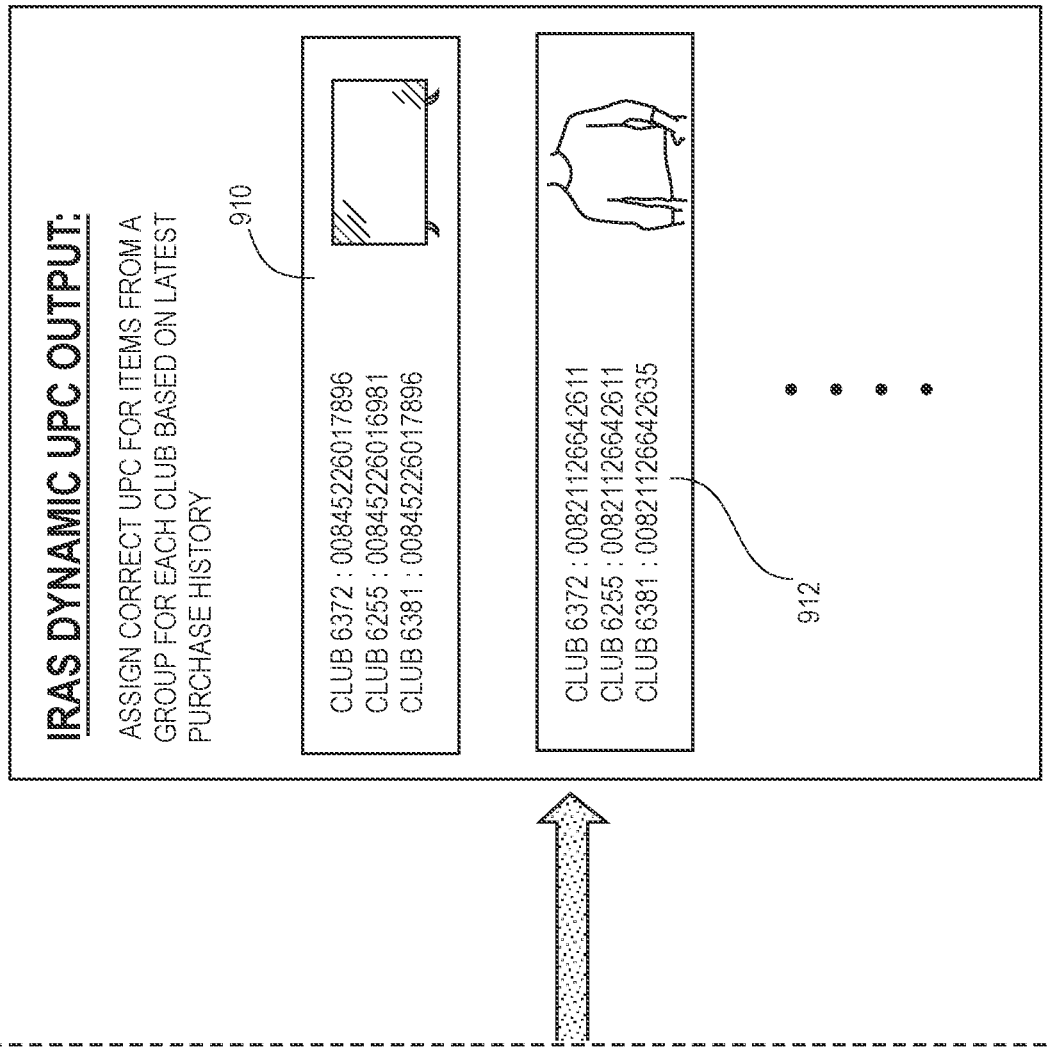
FIG. 9 is a visual illustration of processing captured images of objects at a product storage facility in accordance with some embodiments.
Figure 10:
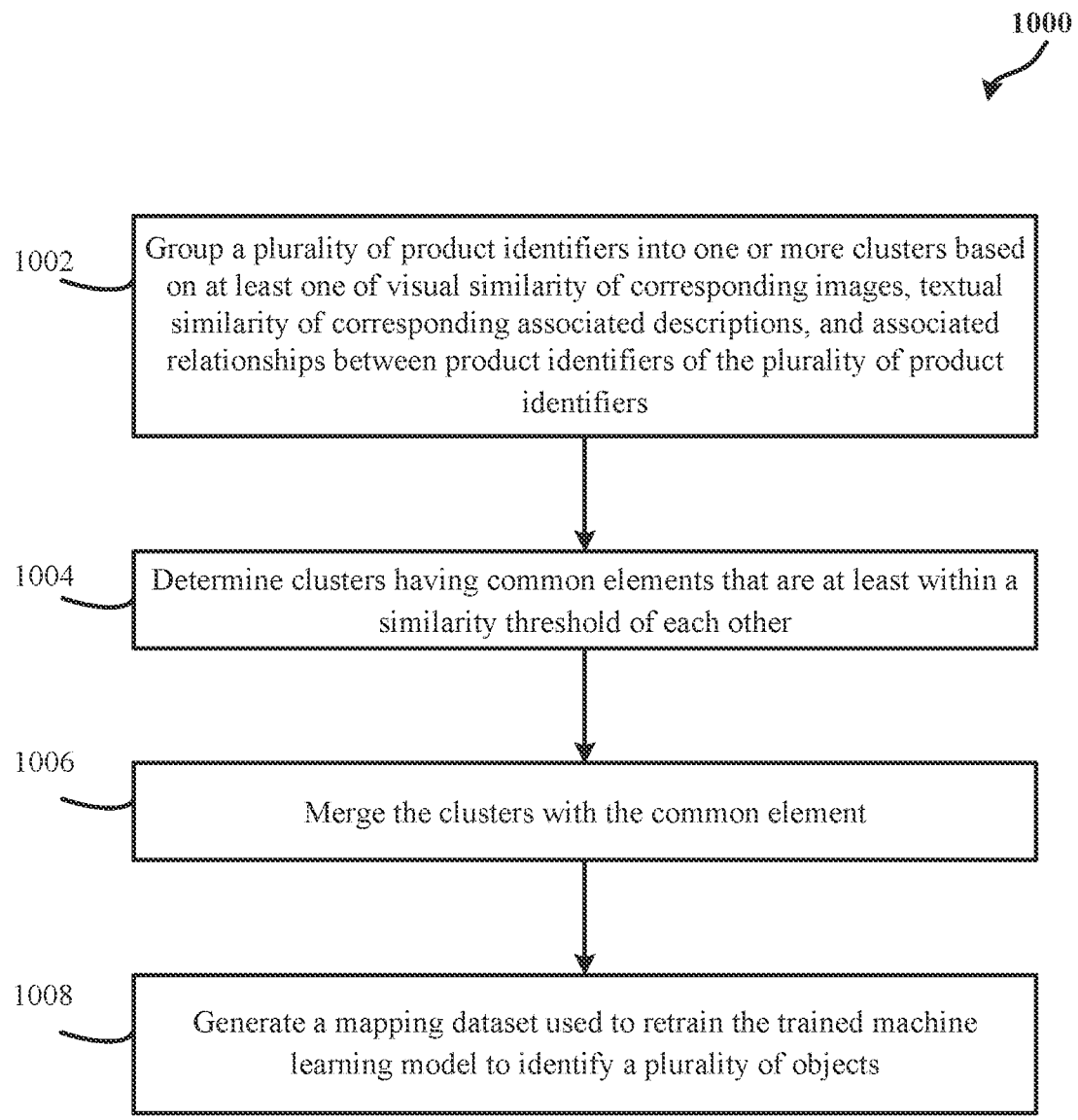
FIG. 10 shows a flow diagram of an exemplary method of processing captured images of objects at a product storage facility in accordance with some embodiments.

In illustrative non-limiting examples, FIGS. 5-10 are concurrently described below. FIG. 5 is a simplified block diagram of an exemplary system 500 for processing captured images of objects at a product storage facility in accordance with some embodiments. FIG. 6 is a visual illustration of grouping based on image similarity in accordance with some embodiments. FIG. 7 is a visual illustration of grouping based on text similarity in accordance with some embodiments. FIG. 8 is a visual illustration of grouping based on parent-child relationship. FIG. 9 is a visual illustration of processing captured images of objects at a product storage facility. FIG. 10 shows a flow diagram of an exemplary method 1000 of processing captured images of objects at a product storage facility in accordance with some embodiments.

In some embodiments, the trained machine learning model 404 may be trained to process captured images to identify different product identifiers (such as UPCs, EPCs, EANs, GTINs, and so on) that correspond to the same product. In some instances, the same product may be referred to under different product identifiers. For example, the same product may have different product identifiers across multiple product storage facilities 105. The product storage facility 105 may include a product distribution center, a fulfillment center, and a retail store, to name a few. Training the trained machine learning model 404 to identify different product identifiers that correspond to the same product may improve on automatic detection and/or recognition of objects including items for commercial sale despite one or more objects being associated with different product identifiers. As such, the trained machine learning model 404 may be able to associate a correct product identifier for the detected object that is appropriate for the particular product storage facility 105 the object was detected; thereby, facilitating in product inventory update and/or restocking, point-of-sale purchase transactions, and/or any activities requiring detection and/or recognition of objects at a particular product storage facility 105.

In some embodiments, the trained machine learning model 404 may include a technique of building a network of graphs and/or creating distinct clusters in the network for grouping similar objects (may also be referred to as items). In some embodiments, nodes in the graph are product identifiers and the presence and/or absence of an edge between two nodes may denote the presence and/or absence of similarity between them. In such embodiments, the trained machine learning model 404 may be include techniques, methods, and/or algorithms trained to perform one or more functions described herein.

In some embodiments, the control circuit 310 executing the trained machine learning model 404 groups a plurality of product identifiers into one or more clusters based on at least one of visual similarity of corresponding images, textual similarity of corresponding associated descriptions, and associated relationships between product identifiers of the plurality of product identifiers. The plurality of product identifiers may include a barcode and a QR code. In some embodiments, the control circuit 310 and/or the trained machine learning model 404 may obtain metadata associated with the plurality of product identifiers and/or images associated with the plurality of product identifiers. By one approach, the control circuit 310 and/or the trained machine learning model 404 may access the database 140 to receive the metadata. In some embodiments, the database 140 may store the metadata associated with the plurality of product identifiers and/or images associated with the plurality of product identifiers. In some embodiments, the plurality of product identifiers may be grouped by the control circuit 310 and/or the trained machine learning model 404 using the metadata corresponding with the plurality of product identifiers. In an illustrative non-limiting example, the plurality of product identifiers and/or corresponding images from a retail catalog 502 (e.g., IRAS catalog in FIG. 5 and/or any retail or commercial product catalogs, listings, assortments and so on) and/or from an application 504 configured for labeling images with recognized or predicted product identifiers (e.g., TrueSpace in FIG. 5), at 1002, may be grouped into one or more clusters by the control circuit 310 executing the trained machine learning model 404. In some embodiments, the grouping is based on image or visual similarity of corresponding images 506, textual similarity of corresponding associated text and/or descriptions 508, and/or associated relationships between product identifiers of the plurality of product identifiers 510 (e.g., grouping based on parent-child relationship). In some embodiments, these groupings are combined 512.

FIG. 6 is a visual illustration of grouping images based on visual appearance or image similarity in accordance with some embodiments. For example, visually similar objects 602, 604, 606 are grouped into a first cluster. In another example, visually similar objects 608, 610 are grouped into a second cluster. In some embodiments, the control circuit 310 and/or the trained machine learning model 404 may scale each of the plurality of images up or down to a standard and/or predefined image size with interpolation in order to minimize information lost. Alternatively or in addition to, hamming distance between images may be calculated by the control circuit 310 and/or the trained machine learning model 404. Alternatively or in addition to, the control circuit 310 and/or the trained machine learning model 404 may group images into a cluster if the calculated hamming distances between images are less than a distance threshold.

In some embodiments, an appropriate threshold (e.g., the distance threshold) for the hamming distances between images may be selected by evaluating the performance of the clustering algorithm (e.g., the trained machine learning model 404) for different values of threshold chosen. For example, a threshold value or a threshold range that gives the maximum similarity for images within a cluster and maximum dissimilarity for images across clusters is chosen as the threshold distance for grouping images.

It is understood that ordinary person in the art knows the general concept of hamming distance and algorithms used to determine a hamming distance between images. However, in some embodiments, product images (e.g., captured images) may be converted to tensors first and then the hamming distance is calculated pairwise among all tensors. For example, a tensor may include an array of numbers arranged on a regular grid with a variable number of axes. In some embodiments, an image may be converted to a corresponding tensor based on pixels associated with the image. With each product identifier as a node, the control circuit 310 and/or the trained machine learning model 404 may then build or generate clusters by creating edges between those pairs whose hamming distance is below the distance threshold. In some embodiments, as a result, images are grouped into clusters of similarly appearing images shown in FIG. 6 as clusters 612, 614, 616, 618 and 620.

FIG. 7 is a visual illustration of grouping based on text similarity in accordance with some embodiments. Alternatively or in addition to, each stored product identifiers in the database 140 may be associated with text description. In some embodiments, the text description may include a plurality of text fields 702 and corresponding values 704, such as line descriptions, category number, and subcategory number, to name a few. In some embodiments, the textual similarity of the corresponding associated descriptions (e.g., text description) is determined based on a match (such as a partial or exact match) of a predefined or preselected text (e.g., key words, characters, text strings, phrases) associated with the corresponding associated descriptions.

For example, the control circuit 310 and/or the trained machine learning model 404 may compare one or more values 704 corresponding to one or more of the plurality of text fields 702 of a first product identifier 706 with those of a second product identifier 708. In an illustrative non-limiting example, the product name and the line1, line2 & line3 descriptions in FIG. 7 may be used for comparing the product similarity. In some embodiments, for a few of the categories, the products (e.g., objects and/or corresponding product identifiers) may be first filtered using the category & subcategory numbers and then similarity of text fields checked for.

In some embodiments, if the comparison results in a match (e.g., an exact match), then the first product identifier 706 and the second product identifier 708 are grouped together. In some embodiments, if the comparison results in a predetermined percentage of match, then the first product identifier 706 and the second product identifier 708 are grouped together. In some embodiments, as a result, product identifiers grouped into clusters by text similarly are shown in FIG. 6 as clusters 712, 714, 716, 718 and 720.

FIG. 8 is a visual illustration of grouping based on parent-child relationship in accordance with some embodiments. Alternatively or in addition to, each of the stored product identifiers in the database 140 may have associated relationships between product identifiers. For example, the associated relationships may include different product identifiers that are variants of same object (e.g., parent-child relationship). For example, parent-child relationship may include variants of the same product in terms of color, design, size, texture etc. as in the case of apparel.

Alternatively or in addition to, the control circuit 310 and/or the trained machine learning model 404 may group product identifiers that are different variants of the same product. In some embodiments, the variants of the same object may include differences in size, color, and pattern. For example, the control circuit 310 and/or the trained machine learning model 404 may access the database 140 and determine that child identifiers 804, 806, 808 are variants of a parent product identifier 802. In response, the control circuit 310 and/or the trained machine learning model 404 may group child identifiers 804, 806, 808 and the parent product identifier 802 into a cluster. In some embodiments, as a result, product identifiers grouped into clusters by relationship are shown in FIG. 8 as clusters 812, 814, 816, 818 and 820.

Alternatively or in addition to, the control circuit 310 and/or the trained machine learning model 404, at 512, may combine the grouping results of grouping based on visual similarity of corresponding images 506, textual similarity of corresponding associated descriptions 508, and/or associated relationships between product identifiers 510. Alternatively or in addition to, the control circuit 310 executing the trained machine learning model 404, at 1004, may determine clusters having common elements that are at least within a similarity threshold of each other. For example, after image clusters may be separately generated using image, text, and parent-child relationship based methods as described herein, graphs may constructed with the product identifiers as nodes and edges may be created among product identifiers belonging to the same group. Since the graphs constructed in each of these methods may lie in the same subspace, there may be overlaps/common nodes between clusters from the different methods. For example, product identifier A may be grouped with product identifiers B, C, and D using image similarity method. In some embodiments, the same product identifier A may be grouped with product identifiers P, Q, and R because of text similarity. In such embodiments, the control circuit 310 executing the trained machine learning model 404 may merge both clusters and consider product identifiers A, B, C, P, Q, and R to be a single cluster of similar items or the same items. Alternatively or in addition to, the control circuit 310 executing the trained machine learning model 404, at 1006, may merge the clusters with the common elements or nodes. Alternatively or in addition to, the control circuit 310 executing the trained machine learning model 404, at 1008, may generate a mapping dataset used to retrain the trained machine learning model to identify a plurality of objects. In some embodiments, the mapping dataset includes a plurality of associations of associated product identifiers to a single object.

In another illustrative non-limiting example, FIG. 9 is a visual illustration of processing captured images of objects at a product storage facility 105. In grouping based on image similarity 506, objects that are visually similar are grouped into a cluster. For example, a first cluster 902 includes televisions that are visually similar but are associated with different product identifiers (shown as numbers below the television). In another example, a second cluster 904 includes t-shirts that are visually similar but are associated with different product identifiers.

In grouping based on text similarity 506, objects that may or may not be visually similar may be grouped together if the text depicted on the images of the objects and/or a selected portion (e.g., the plurality of text fields 702 and the corresponding values 704) of the text description associated with the images and/or the corresponding product identifiers matches. For example, a third cluster 906 may include trashcans and the value "manual trashcan" is associated with the line description text field of each trashcan object. In some embodiments, if the selected text field to determine whether there is a match corresponds to the line description text field, then upon a determination that the corresponding values matches, the control circuit 310 executing the trained machine learning model 404 may group the trashcan objects into a cluster, such as the third cluster 906.

In grouping based on the associated relationships between product identifiers 510, objects that are associated or have product mapping information in the database 140 (e.g., parent-child relationship or variants) are grouped into a cluster. For example, a fourth cluster 908 may include different scented items (e.g., original scent 908a, spring scent 908b, and pine scent 908c) of the same odor eliminator product, and the database 140 may store associations of the original scent 908a as the "parent" and the spring scent 908b and the pine scent 908c as the "child". In such example, the control circuit 310 executing the trained machine learning model 404 may access the database 140 and may determine that the different scented items of the same odor eliminator product are to be grouped as the fourth cluster 908.

In combining the grouping results 512, the control circuit 310 executing the trained machine learning model 404 may generate one or more mapping datasets (e.g., a first mapping dataset 910 and a second mapping dataset 912) used to retrain the trained machine learning model to identify the plurality of objects. In some embodiments, the control circuit 310 executing the trained machine learning model 404 may generate a single dataset including a plurality of associations of associated product identifiers to a single object (e.g., a first association including the first mapping dataset 910 and a second association including the second mapping dataset 912). In some embodiments, a mapping dataset may include a plurality of associations of each of the associated product identifiers to at least one corresponding product storage facility. For example, based on the generated first mapping dataset 910, the control circuit 310 executing the trained machine learning model 404 may recognize an image of a television captured at a product storage facility "Club 6372" as being associated with product identifier "00845226017896".

Figure 11:
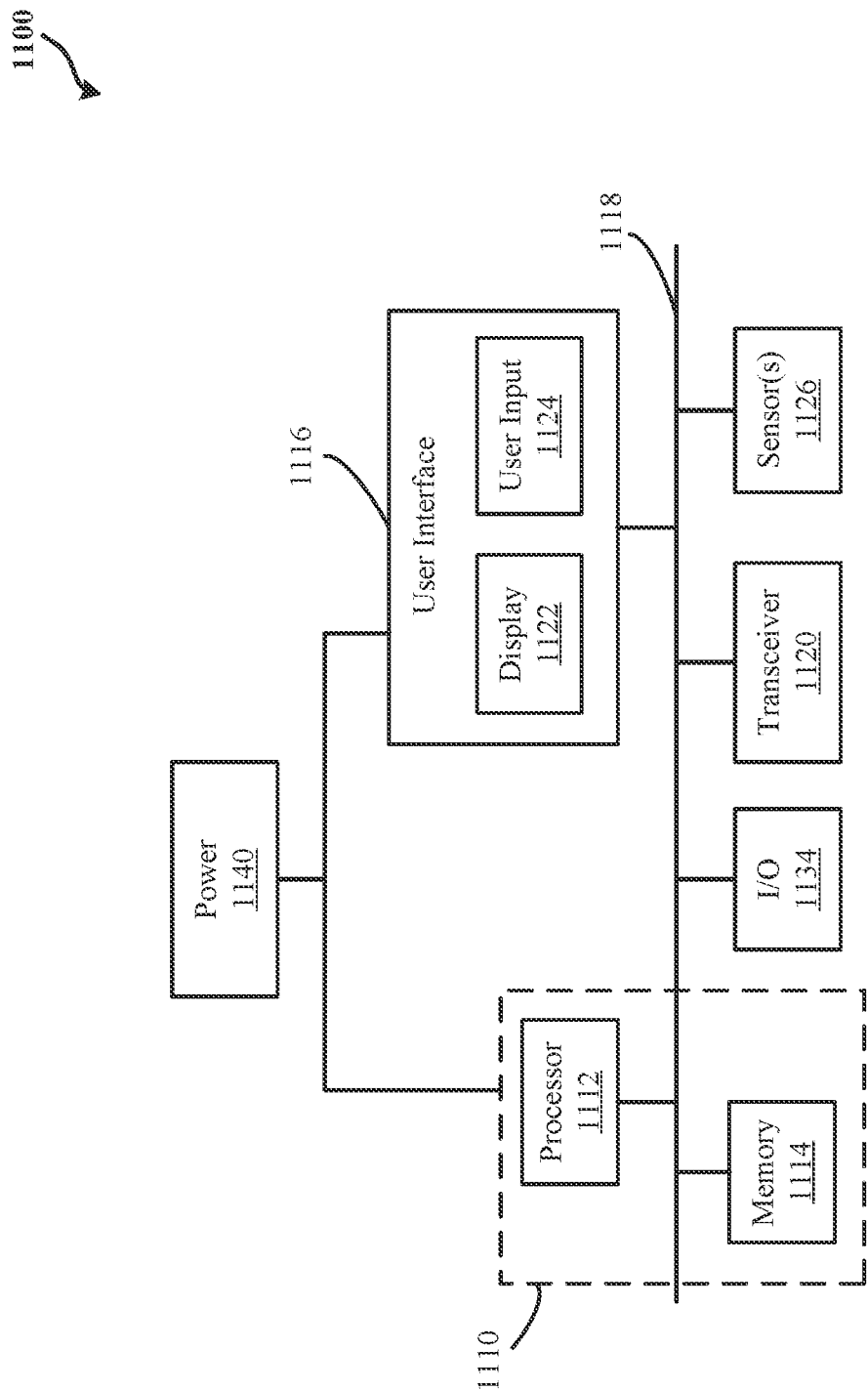
FIG. 11 illustrates an exemplary system for use in implementing methods, techniques, devices, apparatuses, systems, servers, sources and processing captured images of objects at a product storage facility in accordance with some embodiments.

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of the system 100 of FIG. 1, the movable image capture device 120 of FIG. 2, the computing device 150 of FIG. 3, the system 400 of FIG. 4, the system 500 of FIG. 5, the method 1000 of FIG. 10, and/or other above or below mentioned systems or devices, or parts of such circuits, circuitry, functionality, systems, apparatuses, processes, or devices. For example, the system 1100 may be used to implement some or all of the system for processing captured images of objects at a product storage facility, the user interface 350, the control circuit 310, the memory storage/s 402, the database 140, the network 130, the image capture device/s 120 and the motorized robotic unit 406, and/or other such components, circuitry, functionality and/or devices. However, the use of the system 1100 or any portion thereof is certainly not required.

By way of example, the system 1100 may comprise a processor module (or a control circuit) 1112, memory 1114, and one or more communication links, paths, buses or the like 1118. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like. For example, the system 1100 may implement the system for processing captured images of objects at a product storage facility with the control circuit 310 being the control circuit 1112.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) interface 1134 that allow one or more devices to couple with the system 1100. The I/O interface can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1126 to provide information to the system and/or sensor information that is communicated to another component, such as the user interface 350, the control circuit 310, the memory storage/s 402, the database 140, the network 130, the image capture device/s 120 and the motorized robotic unit 406, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor readable and/or computer readable media accessed by at least the control circuit 1112, and can include volatile and/or non-volatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A RETAIL FACILITY filed Jan. 24, 2023, application Ser. No. 18/158,983; entitled SYSTEMS AND METHODS FOR PROCESSING IMAGES CAPTURED AT A PRODUCT STOR- AGE FACILITY filed Jan. 24, 2023, application Ser. No. 18/158,925; and entitled SYSTEMS AND METHODS FOR PROCESSING IMAGES CAPTURED AT A PRODUCT STORAGE FACILITY filed Jan. 24, 2023, application Ser. No. 18/158,950; entitled SYSTEMS AND METHODS FOR ANALYZING AND LABELING IMAGES IN A RETAIL FACILITY filed Jan. 30, 2023, application Ser. No. 18/161,788; entitled SYSTEMS AND METHODS FOR ANALYZING DEPTH IN IMAGES OBTAINED IN PRODUCT STORAGE FACILITIES TO DETECT OUTLIER ITEMS filed Feb. 6, 2023, application Ser. No. 18/165,152; entitled SYSTEMS AND METHODS FOR REDUCING FALSE IDENTIFICATIONS OF PRODUCTS filed Feb. 13, 2023, application Ser. No. 18/168,174; entitled SYSTEMS AND METHODS OF UPDATING MODEL TEMPLATES ASSOCIATED WITH IMAGES OF RETAIL PRODUCTS AT PRODUCT STORAGE FACILITIES filed Jan. 30, 2023, application Ser. No. 18/102,999; entitled SYSTEMS AND METHODS FOR RECOGNIZING PRODUCT LABELS AND PRODUCTS LOCATED ON PRODUCT STORAGE STRUCTURES OF PRODUCT STORAGE FACILITIES filed Feb. 6, 2023, application Ser. No. 18/106,269; and entitled SYSTEMS AND METHODS FOR DETECTING SUPPORT MEMBERS OF PRODUCT STORAGE STRUCTURES AT PRODUCT STORAGE FACILITIES, filed Jan. 30, 2023, application Ser. No. 18/103,338.

What is claimed is:

1. A system for processing captured images of objects at a product storage facility, the system comprising:
   one or more image capture devices configured to capture images of the objects at the product storage facility;
   a trained machine learning model stored in a memory, wherein the trained machine learning model is trained on the images and metadata associated with a plurality of product identifiers, a plurality of product reference images, a plurality of planogram data, or combination thereof; and
   a control circuit executing the trained machine learning model configured to:
   convert the captured images into a plurality tensors;
   group the plurality of product identifiers into one or more clusters based on at least one of visual similarity of corresponding images, textual similarity of corresponding associated descriptions, and associated relationships between product identifiers of the plurality of product identifiers, wherein the visual similarity of the corresponding images is determined based on a calculation of hamming distances pairwise among the plurality of tensors;
   determine clusters having common elements that are at least within a similarity threshold of each other;
   merge the clusters with the common elements; and
   generate a mapping dataset used to retrain the trained machine learning model to identify a plurality of objects, wherein the mapping dataset comprises a plurality of associations of associated product identifiers to a single object.

2. The system of claim 1, further comprising a database configured to store the images.

3. The system of claim 2, wherein at least one of the one or more image capture devices is coupled to a motorized robotic unit.

4. The system of claim 1, wherein the visual similarity of the corresponding images is determined based on a calculation of hamming distances between the corresponding images and a grouping of images having corresponding hamming distances that are less than a distance threshold.

5. The system of claim 1, wherein the textual similarity of the corresponding associated descriptions is determined based on a match of a predefined text associated with the corresponding associated descriptions.

6. The system of claim 1, wherein the product storage facility comprises at least one of: a product distribution center, a fulfillment center, and a retail store.

7. The system of claim 1, wherein the common elements comprise one or more product identifiers.

8. The system of claim 1, wherein the control circuit executing the trained machine learning model is further configured to generate a second mapping dataset used to retrain the trained machine learning model to identify the plurality of objects, wherein the second mapping dataset comprises a plurality of associations of each of the associated product identifiers to at least one corresponding product storage facility.

9. The system of claim 1, wherein the associated relationships comprise different product identifiers that are variants of same object.

10. The system of claim 9, wherein the variants of the same object comprise differences in at least one of: size, color, and pattern.

11. A method for processing captured images of objects at a product storage facility, the method comprising:
    capturing, by one or more image capture devices, images of the objects at the product storage facility;
    training a machine learning model on the images and metadata associated with a plurality of product identifiers, a plurality of product reference images, a plurality of planogram data, or combination thereof;
    converting, by a control circuit, the captures images into a plurality of tensors;
    grouping, by the control circuit executing the trained machine learning model stored in a memory, the plurality of product identifiers into one or more clusters based on at least one of visual similarity of corresponding images, textual similarity of corresponding associated descriptions, and associated relationships between product identifiers of the plurality of product identifiers, wherein the visual similarity of the corresponding images is determined based on a calculation of hamming distances pairwise among the plurality of tensors;
    determining, by the control circuit executing the trained machine learning model, clusters having common elements that are at least within a similarity threshold of each other;
    merging, by the control circuit executing the trained machine learning model, the clusters with the common elements; and
    generating, by the control circuit executing the trained machine learning model, a mapping dataset used to retrain the trained machine learning model to identify a plurality of objects, wherein the mapping dataset comprises a plurality of associations of associated product identifiers to a single object.

12. The method of claim 11, further comprising storing, by a database, the images.

13. The method of claim 12, wherein at least one of the one or more image capture devices is coupled to a motorized robotic unit.

14. The method of claim 12, wherein the visual similarity of the corresponding images is determined based on a calculation of hamming distances between the corresponding images and a grouping of images having corresponding hamming distances that are less than a distance threshold.

15. The method of claim 11, wherein the textual similarity of the corresponding associated descriptions is determined based on a match of a predefined text associated with the corresponding associated descriptions.

16. The method of claim 11, wherein the product storage facility comprises at least one of: a product distribution center, a fulfillment center, and a retail store.

17. The method of claim 11, wherein the common elements comprise one or more product identifiers.

18. The method of claim 11, further comprising generating, by the control circuit executing the trained machine learning model, a second mapping dataset used to retrain the trained machine learning model to identify the plurality of objects, wherein the second mapping dataset comprises a plurality of associations of each of the associated product identifiers to at least one corresponding product storage facility.

19. The method of claim 11, wherein the associated relationships comprise different product identifiers that are variants of same object.

20. The method of claim 19, wherein the variants of the same object comprise differences in at least one of: size, color, and pattern.

\* \* \* \* \*